US009066116B2

(12) United States Patent
Kennedy et al.

(10) Patent No.: US 9,066,116 B2
(45) Date of Patent: Jun. 23, 2015

(54) ENCODING PRE-ROLL ADVERTISEMENTS IN PROGRESSIVELY-LOADING IMAGES

(71) Applicant: Yahoo! Inc., Sunnyvale, CA (US)

(72) Inventors: Lyndon Kennedy, San Francisco, CA (US); Tomasz Gulik, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 58 days.

(21) Appl. No.: 13/965,934

(22) Filed: Aug. 13, 2013

(65) Prior Publication Data

US 2015/0052548 A1 Feb. 19, 2015

(51) Int. Cl.
| | |
|---|---|
| *H04N 21/462* | (2011.01) |
| *H04N 21/654* | (2011.01) |
| *H04N 21/81* | (2011.01) |
| *H04N 21/2343* | (2011.01) |
| *H04N 21/234* | (2011.01) |
| *H04N 21/235* | (2011.01) |
| *H04N 21/2662* | (2011.01) |
| *H04N 21/258* | (2011.01) |
| *H04N 21/435* | (2011.01) |
| *H04N 21/4402* | (2011.01) |

(52) U.S. Cl.
CPC ..... *H04N 21/2343* (2013.01); *H04N 21/23424* (2013.01); *H04N 21/2355* (2013.01); *H04N 21/2662* (2013.01); *H04N 21/25833* (2013.01); *H04N 21/4355* (2013.01); *H04N 21/4402* (2013.01); *H04N 21/4621* (2013.01); *H04N 21/654* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 7,979,877 B2 * | 7/2011 | Huber et al. | 725/36 |
| 2005/0002644 A1 * | 1/2005 | Nakamura et al. | 386/52 |
| 2006/0047967 A1 * | 3/2006 | Akhan et al. | 713/176 |
| 2008/0120676 A1 * | 5/2008 | Morad et al. | 725/127 |
| 2008/0187279 A1 * | 8/2008 | Gilley et al. | 386/52 |
| 2009/0254931 A1 * | 10/2009 | Pizzurro et al. | 725/5 |
| 2010/0061655 A1 * | 3/2010 | Ma | 382/275 |
| 2010/0319037 A1 * | 12/2010 | Kim et al. | 725/81 |
| 2011/0119700 A1 * | 5/2011 | Hamilton | 725/32 |
| 2013/0193210 A1 * | 8/2013 | Iizaka et al. | 235/454 |
| 2014/0007149 A1 * | 1/2014 | Huang et al. | 725/12 |
| 2014/0075469 A1 * | 3/2014 | Zhao | 725/32 |
| 2014/0189731 A1 * | 7/2014 | Emerson, III | 725/34 |
| 2014/0215542 A1 * | 7/2014 | Terpe | 725/112 |
| 2014/0241700 A1 * | 8/2014 | Gilley et al. | 386/250 |
| 2014/0317646 A1 * | 10/2014 | Garza et al. | 725/12 |
| 2014/0331265 A1 * | 11/2014 | Mozell et al. | 725/93 |

* cited by examiner

*Primary Examiner* — Nathan Flynn
*Assistant Examiner* — Omar S Parra
(74) *Attorney, Agent, or Firm* — Mauriel Kapouytian Woods LLP; Andrew A. Noble; James Woods

(57) ABSTRACT

Some embodiments of the invention provide techniques for an advertisement mask and a target media content being jointly encoded, transformed, and progressively rendered for presentation to a user. Specifically, a request for the target media content by a user is received. The target media content and the advertisement mask are scaled and divided into equally sized blocks and, further, jointly encoded into a compressed media file. Transformation of the content of the compressed media file is followed by progressively loading and rendering the advertisement mask and a partially obscured view of the media content. As the target media content is transmitted and fully rendered, the advertisement mask gradually decreases in opacity until it is removed for presentation of the fully-rendered target media content.

14 Claims, 6 Drawing Sheets

ENCODING PRE-ROLL ADVERTISEMENTS IN PROGRESSIVELY-LOADING IMAGES

BACKGROUND

A significant portion of online advertising has centered on user engagement with multimedia content such as images and videos. Typically, advertisements affiliated with such content may be displayed adjacent to the media, "pop-up" temporarily over the media, or be displayed before or during presentation of the media. For example, "pre-roll" advertisements are shown to users before the media is presented. Multimedia—capable mobile devices, such as smartphones and tablets, have formed an increasingly significant means of user engagement with multimedia content and their affiliated advertisements. Because internet bandwidth is much more constrained in this scenario, the cost in terms of time to load both the media and affiliated advertisement might become too much for users to tolerate. One particular problem exacerbating this latency stems from current standard web technologies requiring both the media and affiliated advertisement to be completely received by the browser before being rendered and presented.

Thus, there is need for more novel techniques for transmitting and rendering multimedia content and their affiliated advertisements to account for constrained internet bandwidth speeds.

SUMMARY

Some embodiments of the invention provide methods and systems including an advertisement mask and target media content being jointly encoded, transformed, and progressively rendered for presentation to a user. Specifically, a request for a target media content by a user is received. The target media content and an advertisement mask are scaled and divided into equally sized blocks and, further, jointly encoded into a compressed media file. Transformation of the content of the compressed media file is followed by progressively loading and rendering the advertisement mask and a partially obscured view of the media content. As the target media content is fully loaded and rendered, the advertisement mask gradually decreases in opacity until it is removed for presentation of the fully-rendered target media content.

By way of non-limiting example, "target media content" encompasses media content selected, opened, accessed, downloaded, or otherwise presented to a user. Media content comprises, but is not limited to, file formats pertaining to images, animations, videos, documents, graphics, web pages, and other displayable information to a user. By way of non-limiting example, file formats of images contemplated by some embodiments of the present invention include Joint Photographic Experts Group (JPEG), Graphic Interchanges Format (GIF), Bitmap Image File (BMP), Tagged Image File Format (TIFF), Portable Network Graphics (PNG), and other raster graphic file formats.

While the invention is described with reference to the above drawings, the drawings are intended to be illustrative, and the invention contemplates other embodiments within the spirit of the invention.

DETAILED DESCRIPTION

Figure 1:
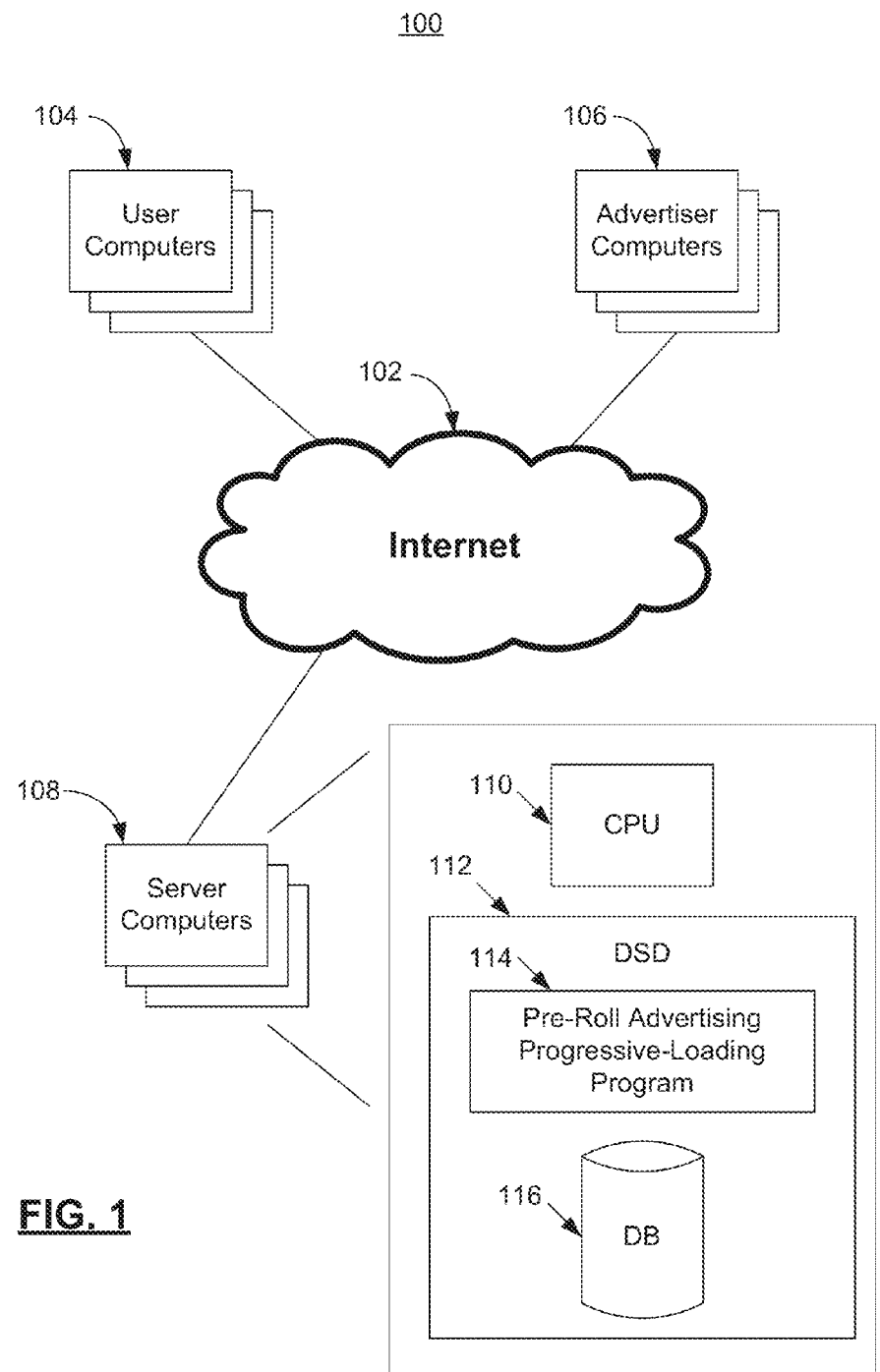
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Pre-Roll Advertising Progressive-Loading Program 114.

The Program 114 is intended to broadly include all programming, applications, algorithms, software and other and tools necessary to implement or facilitate methods and systems according to embodiments of the invention. The elements of the Program 114 may exist on a single server computer or may be distributed among multiple computers or devices.

Some embodiments of the invention provide methods and systems including utilizing search engine output in advertising. In some embodiments, in an auction-based format in which advertisers bid in connection with advertising, advertisers bids, and associated advertisements such as sponsored listings, may be associated with any form or forms of search engine output as well as input.

Figure 2:
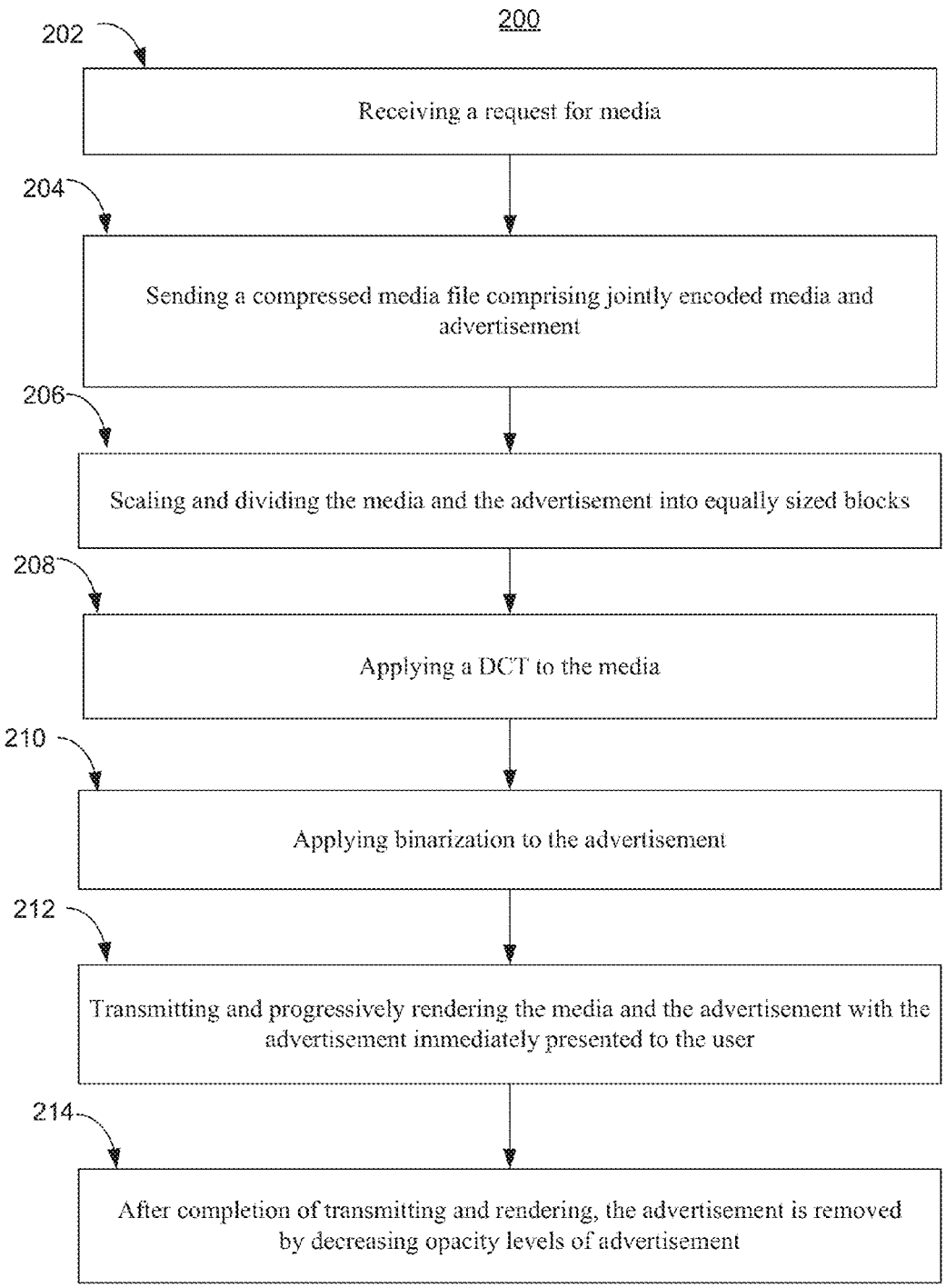
FIG. 2 is a flow diagram illustrating a method according to one embodiment of the invention.

FIG. 2 is a flow diagram of a method 200 according to one embodiment of the invention. At step 202, using one or more computers, a request for a target media content is received. At step 204, using one or more computers, in response to the request for the target media content, a compressed media file is sent, wherein the compressed media file comprises at least the target media content and an advertisement content, and wherein the target media content and the advertisement content are jointly encoded.

At step 206, using one or more computers, the target media content and the advertisement content are scaled and divided into equally sized blocks. At step 208, using one or more computers, a discrete cosine transform (hereinafter, "DCT") is applied to the target media content. At step 210, using one or more computers, binarization techniques are applied to the advertisement content.

At step 212, using one or more computers, the target media content and the advertisement content are transmitted and progressively rendered such that the advertisement content can be rendered for immediate presentation to a user. At step 214, using one or more computers, upon completion of the transmitting and rendering, the advertisement content is removed such that the target media content is presented to the user, wherein removing the advertisement content comprises decreasing, for each scaled and equally sized block of both target media content and advertisement content, an opacity level associated with less-visibility of the target media content through the advertisement content.

Figure 3:
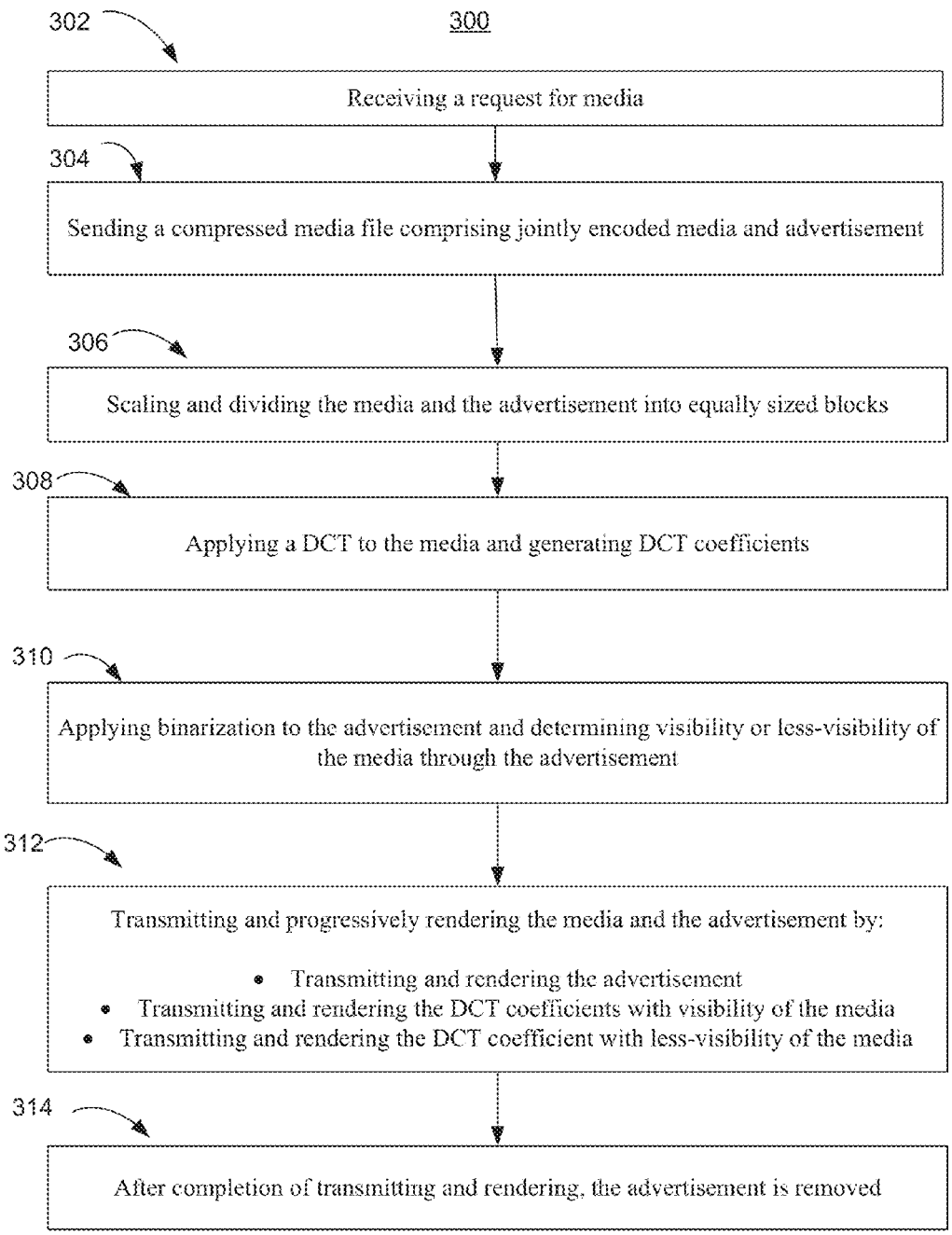
FIG. 3 is a flow diagram illustrating a method according to one embodiment of the invention.

FIG. 3 is a flow diagram of a method 300 according to one embodiment of the invention. At step 302, using one or more computers, a request for a target media content is received. At step 304, using one or more computers, in response to the request for the target media content, a compressed media file is sent, wherein the compressed media file comprises at least the target media content and an advertisement content, and wherein the target media content and the advertisement content are jointly encoded.

At step 306, using one or more computers, the target media content and the advertisement content are scaled and divided into equally sized blocks. At step 308, using one or more computers, a DCT is applied to the target media content, wherein applying a DCT comprises generating, for each scaled and equally sized block of the target media content, DCT coefficients. At step 310, using one or more computers, binarization techniques are applied to the advertisement content, wherein applying binarization techniques comprises determining, for each scaled and equally sized block of the advertisement content, visibility or less-visibility of the target media content through the advertisement content.

At step 312, using one or more computers, the target media content and the advertisement content are transmitted and progressively rendered such that the advertisement content can be rendered for immediate presentation to a user, wherein the transmitting and progressively rendering comprises, for each scaled and equally sized block of both target media content and advertisement content: transmitting and rendering the advertisement content; transmitting and progressively rendering the DCT coefficients with visibility of the target media content through the advertisement content; and transmitting and progressively rendering the DCT coefficients with less-visibility of the target media content through the advertisement content. At step 314, using one or more computers, upon completion of the transmitting and rendering, the advertisement content is removed such that the target media content is presented to the user.

Figure 4:
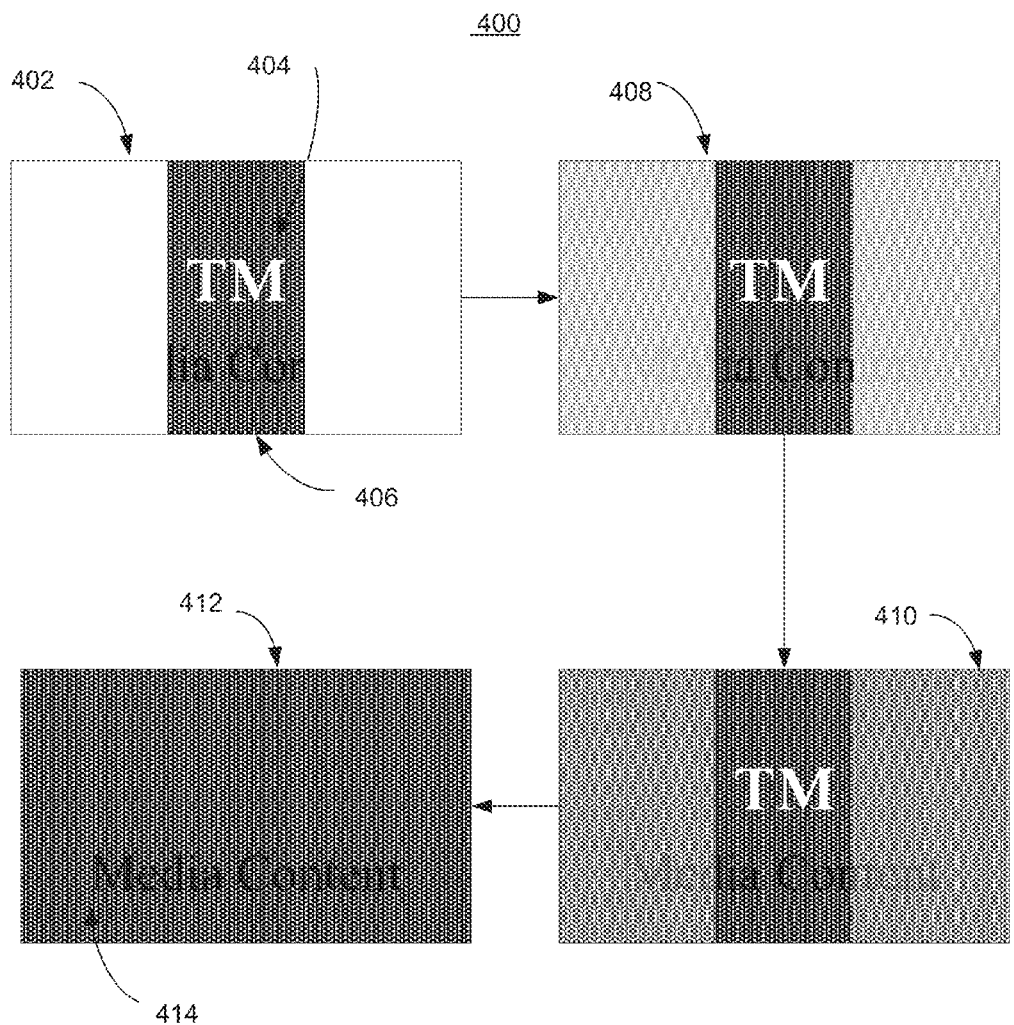
FIG. 4 is flow diagram illustrating a method according to one embodiment of the invention.

FIG. 4 is a flow diagram of a method 400 according to one embodiment of the invention. Specifically, an non-limiting example of a pre-roll advertisement scenario is depicted. The configuration of the image content and advertisement mask and its elements are merely used for illustrative purposes, and many different configurations are possible.

As depicted, the compressed image file 402 comprised of the entire image content 412 and advertisement mask 404 begins to load. The advertisement mask 404 is visible along with a visible portion of the image content 406. The advertisement mask 404 is displayed throughout as a partial occlusion of the entire image content 412, with extraneous content blocked out in the shape of a logo or other message. The remainder of the entire image content 412 is not available until it has been progressively loaded and rendered in its entirety. As shown in Blocks 408 and 410, as the entire image content 412 continues to be progressively loaded and rendered, previously less visible image content 414 begins to be displayed through the advertisement mask 404. Once the entire image content 412 has been fully loaded and rendered, the advertisement mask 404 is completely removed. As shown in this depiction, one embodiment of the invention encompasses the advertisement mask 404 gradually decreasing in opacity as the entire image content 412 is progressively loaded and rendered for display.

Figure 5:
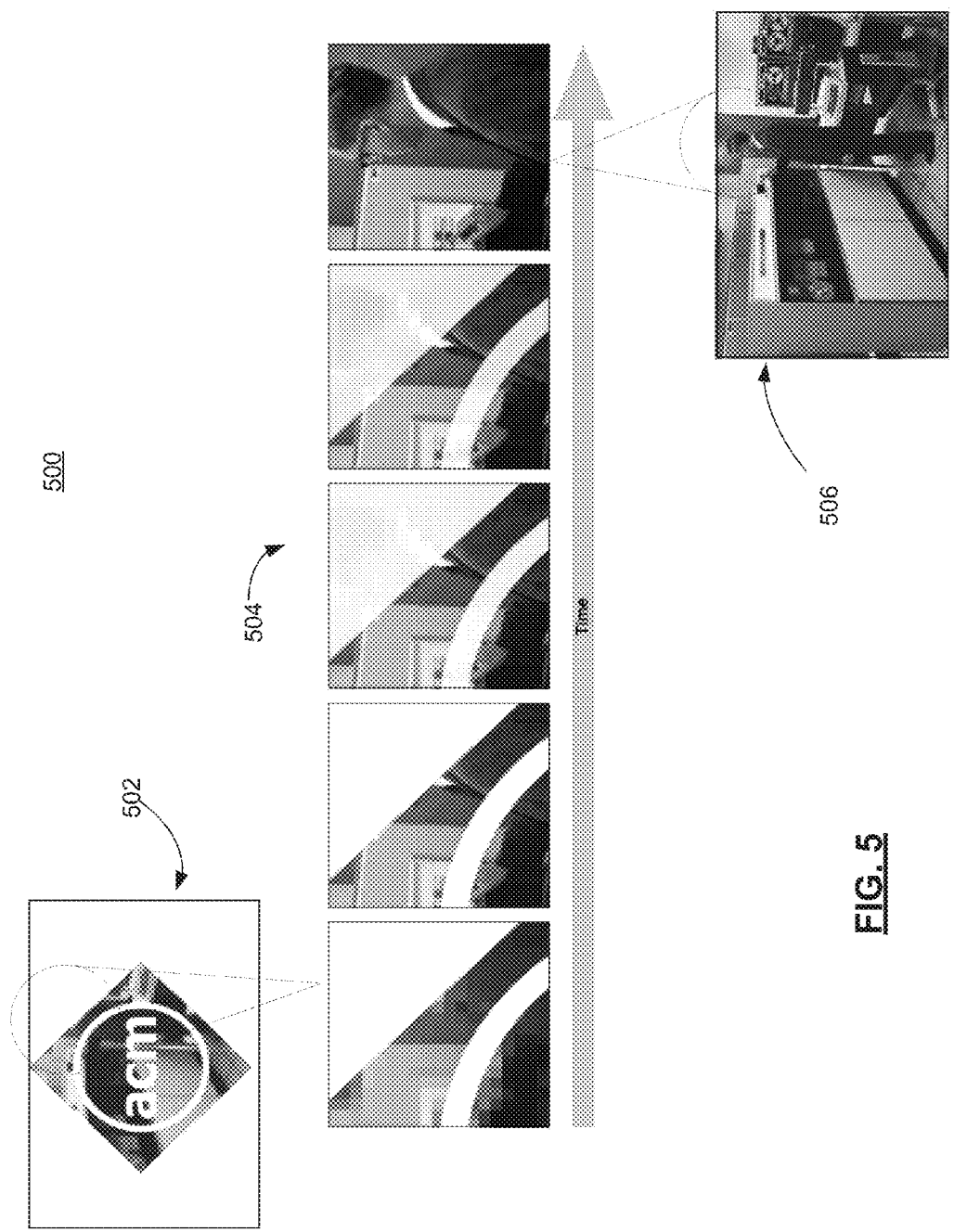
FIG. 5 is a flow diagram illustrating a method according to one embodiment of the invention.

FIG. 5 is a flow diagram of a method 500 according to one embodiment of the invention. Block 502 represents the initial advertisement mask and visible image content as sent for display to a user. Block 504 is a magnified time series view of a cross-section of 502, showcasing how, as the image content is progressively loaded and rendered, the previously visible image content is rendered in more detail and the previously less-visible image content becomes more viewable through the advertisement mask until fully rendered, at which point the advertisement mask is removed and the image is displayed in its entirety, as shown in Block 506.

Figure 6:
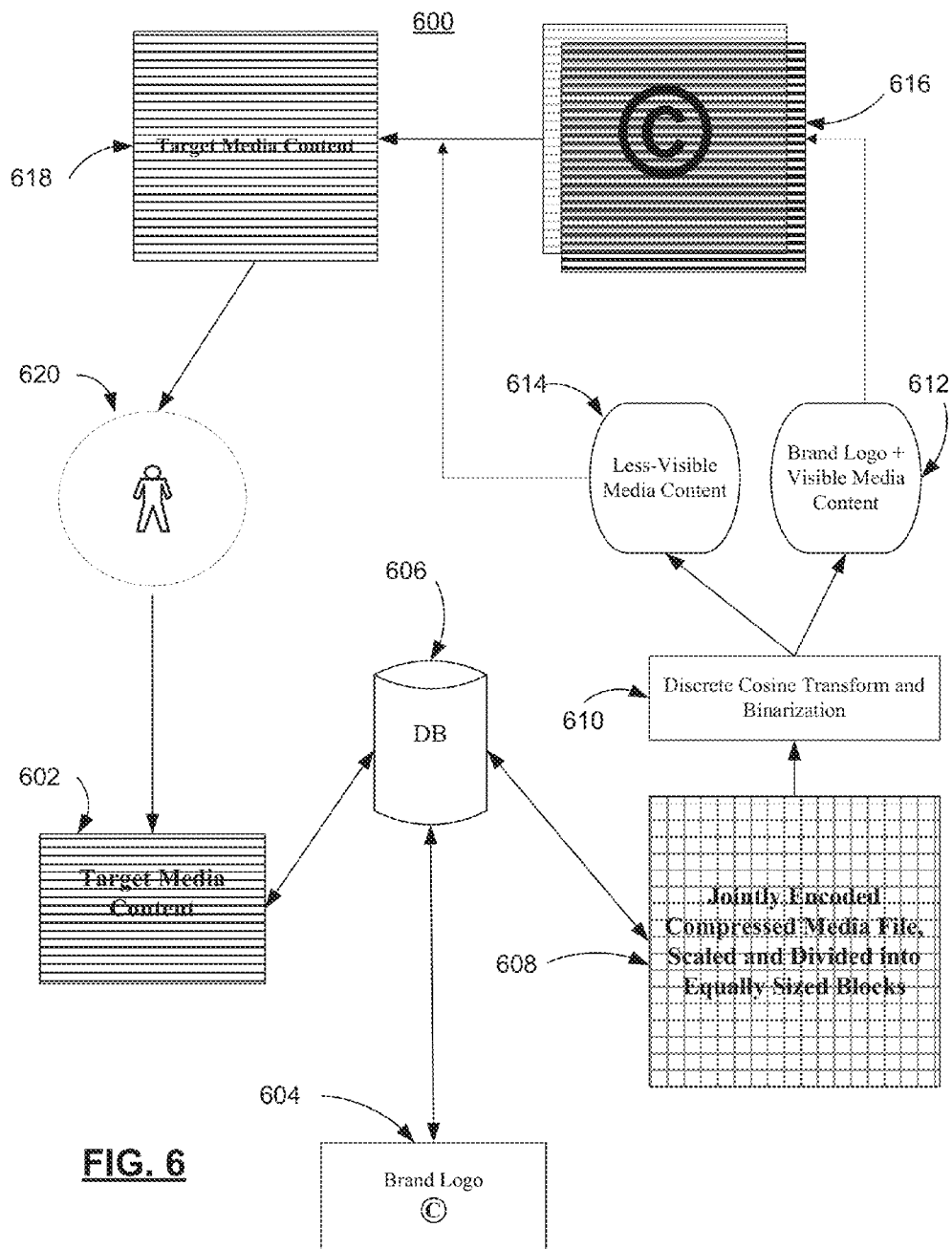
FIG. 6 is a block diagram illustrating one embodiment of the invention.

FIG. 6 is a block diagram 600 illustrating one embodiment of the invention. Specifically, the brand logo 604 and target media content 602 are coupled to a database 606. The target media content 602 is selected by a user 620. When information pertaining to both target media content 602 and brand logo 604 is sent to the database 606, the content is compressed and jointly encoded as a file before being scaled and divided into equally sized blocks, as shown in Block 608. After relevant portions of each equally scaled and sized block of the compressed file undergo DCT and binarization, the components pertaining to both the brand logo and visible media content 612 are initially transmitted, as depicted in Block 616, while the less-visible media content 614 is progressively added to fully render the target media content without the brand logo 604, as depicted in Block 618, which is presented to the user 620 who had initially selected the target media content 602.

Some embodiments of the present invention, both the image content and the advertisement mask are iteratively rendered for presentation to a user. From the perspective of the user, the advertisement mask is received first and can be analyzed to determine the order in which the equally scaled and sized blocks received are rendered.

In some embodiments, the equally scaled and sized blocks are 8-pixel square blocks. In such embodiments, there would be 64 DCT coefficients per 8-pixel block being transmitted as two distinct sets, comprising a total of 128 iterative steps to receive and render the image content and advertisement mask.

Some embodiments as described above can be described with reference to the equation:

$$I_{display} = (1-\alpha_j)*I_j + \alpha_j*\text{mask}(I_j) \qquad \text{Eq. 1}$$

In Eq. 1, at each iterative step j, $I_{display}$ represents the image displayed to a user, composed of a weighted linear sum of image content as it has been rendered with the equally scaled and sized blocks and DCT coefficients received thus far, $I_j$, and a version of $I_j$ with the advertisement mask applied. The smoothing factor $\alpha_j$ is defined via a non-linear logistic function:

$$\alpha_j = \begin{cases} 1 & j < 64 \\ \dfrac{1}{1+e^{-\beta(96-j)}} & j \geq 64 \end{cases} \quad \text{Eq. 2}$$

Applying Eq. 2, the masked image is shown in full until the less-visible equally scaled and sized blocks outside of the advertisement mask area (after the 64$^{th}$ iterative step) are received. At that point, the advertisement mask is eased off in opacity while the remaining equally scaled and sized boxes are rendered. The logistic function of Eq. 2 is essentially still valued at unity for the smaller values of j; is equal to 0.5 at j=96, and is functionally 0 to the very last values of j. The parameter β is tunable to adjust the speed of this transition.

In some embodiments of the invention, it is observed that low-frequency variations in images are perceptually much more important than high-frequency ones. Therefore, a two-dimensional DCT is applied and the high-frequency components of the transform are aggressively quantized (often times so much so that they are effectively binarized), while the low-frequency components are only slightly quantized. It is also noted that the luminance (or equivalent gray scale) of the image is much more important for perception than the coloration of the image. Typically, RGB images are represented as YCbCr images, where Y is the luminance channel and Cb and Cr are the blue and red chroma channels, respectively, which contain the information necessary for colorizing the luminance image. Different quantization tables can be used for each channel, typically applying a much more aggressive quantization of the chroma channels than the luminance channel. The output of all of this transformation and quantization is still the same number of bits as the original image, just represented in the frequency domain. Additionally, it is noted that the distribution of values within the transformed quantized image is very lopsided, with many zero-valued components, which makes this representation of the image much more suitable for Huffman coding.

Some embodiments of the invention include techniques related to a faster advertisement experience for the user than a baseline implementation requiring full transmission of both the image content and advertisement content. Some embodiments of the invention include advertisement content that is presented as a brand logo serving as an advertisement mask layered on top of the target media content. Some embodiments of the invention include techniques to prevent against methods that have been used to block advertisement experiences on the web.

Some embodiments of the invention include techniques to apply saliency detection to find the most visually relevant portion of the media content and center the advertisement content there. By way of non-limiting example, an advertisement could be placed unobtrusively in a corner of an image (e.g. watermark) and progressively diminish as the image content is received and rendered.

Some embodiments of the invention include techniques to enhance the legibility of advertisement content if the underlying media content is also white, by analyzing image color distributions to determine a masking color to use that will provide an appropriate level of contrasts when the image is rendered.

Some embodiments of the invention include techniques for identifying visual concepts present within the media content as visual cues for mechanisms in matching a topically relevant advertisement to the media content. By way of non-limiting example, relevant brands logos may be automatically associated with relevant image content.

While the invention is described with reference to the above drawings, the drawings are intended to be illustrative, and the invention contemplates other embodiments within the spirit of the invention.

The invention claimed is:

1. A method of delivering content and advertisement, the method comprising:
   using one or more computers, receiving a request for a target media content;
   using one or more computers, sending, in response to the request for the target media content, a compressed media file, wherein the compressed media file comprises at least the target media content and an advertisement content, and wherein the target media content and the advertisement content are jointly encoded;
   using one or more computers, scaling and dividing the target media content and the advertisement content into equally sized blocks;
   using one or more computers, applying a discrete cosine transform to the target media content, wherein applying a discrete cosine transform comprises generating, for each scaled and equally sized block of the target media content, discrete cosine transform coefficients;
   using one or more computers, applying binarization techniques to the advertisement content, wherein applying binarization techniques comprises determining, for each scaled and equally sized block of the advertisement content, visibility or less-visibility of the target media content through the advertisement content;
   using one or more computers, transmitting and progressively rendering the target media content and the advertisement content such that the advertisement content can be rendered for immediate presentation to a user, wherein transmitting and progressively rendering comprises, for each scaled and equally sized block of both target media content and advertisement content:
      transmitting and rendering the advertisement content;
      transmitting and progressively rendering the discrete cosine transform coefficients with visibility of the target media content through the advertisement content; and
      transmitting and progressively rendering the discrete cosine transform coefficients with less-visibility of the target media content through the advertisement content; and
   using one or more computers, upon completion of the transmitting and rendering, removing the advertisement content such that the target media content is presented to the user.

2. The method of claim 1, further comprising:
   using one or more computers, based on at least applying the discrete cosine transform, applying quantization techniques to components of the target media content.

3. The method of claim 1, wherein the transmitting and progressively rendering the target media content and advertisement content comprises rendering and presenting the target media content and advertisement content through a series of iterative steps.

4. The method of claim 1, wherein removing the advertisement content comprises decreasing, for each scaled and equally sized block of both target media content and advertisement content, an opacity level associated with less-visibility of the target media content through the advertisement content.

5. The method of claim 1, wherein the advertisement content is a brand logo.

6. The method of claim 1, wherein the transmitting and progressively rendering the target media content and the advertisement content comprises transmitting to and rendering in a tablet device.

7. The method of claim 1, wherein the transmitting and progressively rendering the target media content and the advertisement content comprises transmitting to and rendering in a mobile device.

8. The method of claim 1, wherein the compressed media file comprises a joint pictures expert group (JPEG) standard image format file.

9. A system comprising:
one or more server computers coupled to a network; and
one or more databases coupled to the one or more servers;
wherein the one or more server computers are for:
receiving a request for a target media content;
sending, in response to the request for the target media content, a compressed media file, wherein the compressed media file comprises at least the target media content and an advertisement content, and wherein the target media content and the advertisement content are jointly encoded;
scaling and dividing the target media content and the advertisement content into equally sized blocks;
applying a discrete cosine transform to the target media content, wherein applying a discrete cosine transform comprises generating, for each scaled and equally sized block of the target media content, discrete cosine transform coefficients;
applying binarization techniques to the advertisement content, wherein applying binarization techniques comprises determining, for each scaled and equally sized block of the advertisement content, visibility or less-visibility of the target media content through the advertisement content;
transmitting and progressively rendering the target media content and the advertisement content such that the advertisement content can be rendered for immediate presentation to a user, wherein transmitting and progressively rendering comprises, for each scaled and equally sized block of both target media content and advertisement content:
transmitting and rendering the advertisement content;
transmitting and progressively rendering the discrete cosine transform coefficients with visibility of the target media content through the advertisement content; and
transmitting and progressively rendering the discrete cosine transform coefficients with less-visibility of the target media content through the advertisement content; and
upon completion of the transmitting and rendering, removing the advertisement content such that the target media content is presented to the user.

10. The system of claim 9, further configured for:
based on at least applying the discrete cosine transform, applying quantization techniques to components of the target media content.

11. The system of claim 9, wherein the transmitting and progressively rendering the target media content and advertisement content comprises rendering and presenting the target media content and advertisement content through a series of iterative steps.

12. The system of claim 9, wherein removing the advertisement content comprises decreasing, for each scaled and equally sized block of both target media content and advertisement content, an opacity level associated with less-visibility of the target media content through the advertisement content.

13. The system of claim 9, wherein the transmitting and progressively rendering the target media content and the advertisement content comprises transmitting to and rendering in a mobile device.

14. A non-trasitory computer readable medium or media containing instructions for executing a method for use in association with delivering content and advertisement, the method comprising:
using one or more computers, receiving a request for a target media content;
using one or more computers, sending, in response to the request for the target media content, a compressed media file, wherein the compressed media file comprises at least the target media content and an advertisement content, and wherein the target media content and the advertisement content are jointly encoded;
using one or more computers, scaling and dividing the target media content and the advertisement content into equally sized blocks;
using one or more computers, applying a discrete cosine transform to the target media content, wherein applying a discrete cosine transform comprises generating, for each scaled and equally sized block of the target media content, discrete cosine transform coefficients;
using one or more computers, applying binarization techniques to the advertisement content, wherein applying binarization techniques comprises determining, for each scaled and equally sized block of the advertisement content, visibility or less-visibility of the target media content through the advertisement content;
using one or more computers, transmitting and progressively rendering the target media content and the advertisement content such that the advertisement content can be rendered for immediate presentation to a user, wherein transmitting and progressively rendering comprises, for each scaled and equally sized block of both target media content and advertisement content:
transmitting and rendering the advertisement content;
transmitting and progressively rendering the discrete cosine transform coefficients with visibility of the target media content through the advertisement content; and
transmitting and progressively rendering the discrete cosine transform coefficients with less-visibility of the target media content through the advertisement content; and
using one or more computers, upon completion of the transmitting and rendering, removing the advertisement content such that the target media content is presented to the user.

* * * * *